US010190287B2

(12) United States Patent
Koetz et al.

(10) Patent No.: US 10,190,287 B2
(45) Date of Patent: Jan. 29, 2019

(54) INDUSTRIAL MACHINE COMPONENT DETECTION AND PERFORMANCE CONTROL

(71) Applicant: Harnischfeger Technologies, Inc., Wilmington, DE (US)

(72) Inventors: John Koetz, Mount Pleasant, WI (US); Matt Reiland, Mequon, WI (US); Wesley P. Taylor, Glendale, WI (US)

(73) Assignee: Joy Global Surface Mining Inc, Milwaukee, WI (US)

( * ) Notice: Subject to any disclaimer, the term of this patent is extended or adjusted under 35 U.S.C. 154(b) by 88 days.

(21) Appl. No.: 15/445,659

(22) Filed: Feb. 28, 2017

(65) Prior Publication Data

US 2017/0175359 A1    Jun. 22, 2017

Related U.S. Application Data

(62) Division of application No. 14/719,624, filed on May 22, 2015, now Pat. No. 9,611,625.

(51) Int. Cl.
*E02F 9/26* (2006.01)
*G05B 15/02* (2006.01)
(Continued)

(52) U.S. Cl.
CPC .............. *E02F 9/26* (2013.01); *E02F 9/268* (2013.01); *G05B 15/02* (2013.01);
(Continued)

(58) Field of Classification Search
CPC ...... G06K 19/06; G06K 9/00369; G06K 9/20; G06F 17/00; G06F 17/30; G06F 19/00;
(Continued)

(56) References Cited

U.S. PATENT DOCUMENTS 5,144,762 A    9/1992 Robinson
5,627,749 A    5/1997 Waterman et al.
(Continued)

FOREIGN PATENT DOCUMENTS

AU    2010100656    7/2010
AU    2012302078 B2    3/2013
(Continued)

OTHER PUBLICATIONS

International Search Report and Written Opinion for Application No. PCT/US2012/052798 dated Nov. 16, 2012 (5 pages).
(Continued)

*Primary Examiner* — Behrang Badii
(74) *Attorney, Agent, or Firm* — Michael Best & Friedrich LLP

(57) ABSTRACT

An industrial machine that includes a plurality of components, an identification tag reader, an actuator, and a controller. The plurality of components is installed in the industrial machine and each of the plurality of components includes an identification tag. The identification tag reader is receives a signal from each of the plurality of identification tags, and each signal received from the plurality of identification tags is specific to a respective one of the plurality of components. The controller identifies the plurality of components that is installed in the industrial machine based on the signals from each of the plurality of identification tags, compares the identified plurality of components to a predetermined list of components that are expected to be installed in the industrial machine, and modifies an operational setting of an operating parameter when the identified plurality of components does not match the predetermined list of components.

20 Claims, 8 Drawing Sheets

(51) Int. Cl.
*G05B 19/042* (2006.01)
*G01S 5/14* (2006.01)
*G06F 17/00* (2006.01)
*B60R 13/10* (2006.01)
*G08G 1/017* (2006.01)
*B60M 7/00* (2006.01)
*G05D 1/00* (2006.01)
*G01B 15/02* (2006.01)
*H04W 12/06* (2009.01)
*H04W 52/04* (2009.01)
*H04W 64/00* (2009.01)
*G01S 11/02* (2010.01)
*G05B 19/00* (2006.01)
*B60L 5/38* (2006.01)
*G05D 1/02* (2006.01)
*G01C 21/00* (2006.01)
*H04W 4/80* (2018.01)
*G07B 15/02* (2011.01)
*E02F 3/30* (2006.01)
*H04B 5/00* (2006.01)
*E02F 3/47* (2006.01)

(52) U.S. Cl.
CPC ............ *G05B 19/0426* (2013.01); *B60L 5/38* (2013.01); *B60M 7/00* (2013.01); *B60R 13/10* (2013.01); *B60R 13/105* (2013.01); *E02F 3/308* (2013.01); *E02F 3/47* (2013.01); *G01B 15/02* (2013.01); *G01C 21/00* (2013.01); *G01S 5/14* (2013.01); *G01S 11/02* (2013.01); *G05B 19/00* (2013.01); *G05B 2219/2616* (2013.01); *G05D 1/00* (2013.01); *G05D 1/02* (2013.01); *G06F 17/00* (2013.01); *G07B 15/02* (2013.01); *G08G 1/017* (2013.01); *H04B 5/0062* (2013.01); *H04W 4/80* (2018.02); *H04W 12/06* (2013.01); *H04W 52/04* (2013.01); *H04W 64/00* (2013.01); *Y02P 90/86* (2015.11)

(58) Field of Classification Search
CPC ......... G06F 9/451; G07B 15/02; B60R 13/10; B60R 13/105; G01S 5/14; G01S 13/88; G01S 13/765; G01S 11/02; G05D 1/02; G05D 1/00; H01L 21/00; H01L 21/67; H01L 21/677; G05B 15/02; G05B 19/0426; G05B 19/00; G05B 2219/2616; E02F 9/26; E02F 9/268; E02F 3/308; E02F 3/47; H04N 7/18; H04N 5/782; H04N 5/913; H04N 21/4131; H04N 21/42201; H04N 21/44222; H04N 21/4532; H04N 21/47; E01C 1/00; G11B 27/105; G06Q 30/0261; Y02P 90/86; H04W 4/80; H04W 12/06; H04W 52/04; H04W 64/00; B60L 5/38; B60M 7/00; G01B 15/02; G01C 21/00; G08G 1/017; H04B 5/0062
See application file for complete search history.

(56) References Cited

U.S. PATENT DOCUMENTS

| | | |
|---|---|---|
| 5,709,043 A | 1/1998 | Jones et al. |
| 5,743,031 A | 4/1998 | Launder et al. |
| 5,743,033 A | 4/1998 | Gegel |
| 5,937,550 A | 8/1999 | Emrich |
| 6,030,143 A | 2/2000 | Kreitzberg |
| 6,229,443 B1 | 5/2001 | Roesner |
| 6,374,990 B1 | 4/2002 | Swinderman |
| 6,400,996 B1 * | 6/2002 | Hoffberg ............ G05B 19/0426 370/218 |
| 6,415,916 B1 | 7/2002 | Rini |
| 6,469,638 B1 | 10/2002 | Johnson |
| 6,578,294 B2 | 6/2003 | Ollinger, IV |
| 6,729,052 B2 | 5/2004 | Ollinger, IV et al. |
| 6,735,890 B2 | 5/2004 | Carpenter et al. |
| 6,870,485 B2 | 3/2005 | Lujan et al. |
| 6,932,891 B2 | 8/2005 | Wigg et al. |
| 6,986,216 B2 | 1/2006 | Emrich et al. |
| 6,990,390 B2 | 1/2006 | Groth et al. |
| 6,993,861 B2 | 2/2006 | Carpenter et al. |
| 7,042,346 B2 | 5/2006 | Paulsen |
| 7,080,470 B2 | 7/2006 | Jones |
| 7,100,315 B2 | 9/2006 | Carpenter et al. |
| 7,139,494 B2 | 11/2006 | Ono et al. |
| 7,143,007 B2 | 11/2006 | Long et al. |
| 7,165,347 B2 | 1/2007 | Ollinger, IV et al. |
| 7,171,771 B2 | 2/2007 | Briscoe |
| 7,174,661 B2 | 2/2007 | Briscoe |
| 7,177,553 B2 | 2/2007 | Ono |
| 7,199,718 B2 | 4/2007 | Kikuchi et al. |
| 7,248,154 B2 | 7/2007 | Menke |
| 7,257,504 B2 | 8/2007 | Bolander et al. |
| 7,299,570 B2 | 11/2007 | Emrich et al. |
| 7,367,144 B2 | 5/2008 | Jones et al. |
| 7,406,399 B2 | 7/2008 | Furem et al. |
| 7,408,456 B2 | 8/2008 | Whitesmith et al. |
| 7,432,812 B2 | 10/2008 | Ray |
| 7,451,558 B2 | 11/2008 | Jones |
| 7,509,834 B2 | 3/2009 | Bauchot et al. |
| 7,526,886 B2 | 5/2009 | McClanahan et al. |
| 7,536,811 B2 | 5/2009 | McClanahan |
| 7,579,952 B2 | 8/2009 | Osterholt et al. |
| 7,652,579 B2 | 1/2010 | Keyaki et al. |
| 7,730,651 B2 | 6/2010 | Carpenter |
| 7,730,652 B2 | 6/2010 | McClanahan et al. |
| 7,739,814 B2 | 6/2010 | Carpenter et al. |
| 7,774,959 B2 | 8/2010 | Kubo et al. |
| 7,827,846 B2 | 11/2010 | Bauchot et al. |
| 7,832,129 B2 | 11/2010 | Briscoe |
| 7,855,663 B2 | 12/2010 | Briscoe |
| 7,874,086 B2 | 1/2011 | Briscoe et al. |
| 7,882,649 B2 | 2/2011 | Carpenter et al. |
| 7,898,403 B2 | 3/2011 | Ritter et al. |
| 7,918,514 B2 | 4/2011 | Dal Pra' |
| 7,950,578 B2 | 5/2011 | Majer |
| 7,997,017 B2 | 8/2011 | McClanahan et al. |
| 8,004,397 B2 | 8/2011 | McClanahan et al. |
| 8,024,874 B2 | 9/2011 | McClanahan et al. |
| 8,061,064 B2 | 11/2011 | Ollinger, IV et al. |
| 8,074,383 B2 | 12/2011 | McClanahan |
| 8,104,200 B2 | 1/2012 | Briscoe |
| 8,122,621 B2 | 2/2012 | Carpenter et al. |
| 8,203,425 B1 * | 6/2012 | Medina, III ........... G08G 1/017 340/5.65 |
| 8,250,785 B2 | 8/2012 | Kubo et al. |
| RE43,629 E | 9/2012 | Wu |
| 8,308,094 B2 | 11/2012 | Hoice et al. |
| 8,312,650 B2 | 11/2012 | McClanahan et al. |
| 8,356,432 B2 | 1/2013 | Carpenter |
| 8,392,764 B2 | 3/2013 | de Buen |
| 8,411,930 B2 | 4/2013 | Ridley et al. |
| 8,572,870 B2 | 11/2013 | Kudo et al. |
| 8,578,637 B2 | 11/2013 | Ollinger, IV et al. |
| 8,694,223 B2 | 4/2014 | Tseng et al. |
| 8,763,282 B2 | 7/2014 | Brufau Guinovart et al. |
| 8,775,010 B2 | 7/2014 | Sohmshetty et al. |
| 8,798,852 B1 | 8/2014 | Chen et al. |
| 8,806,785 B2 | 8/2014 | Brufau Guinovart et al. |
| 8,825,289 B2 | 9/2014 | Daly et al. |
| 8,872,643 B2 | 10/2014 | Ebert |
| 8,890,672 B2 | 11/2014 | Miller |
| 9,041,533 B1 * | 5/2015 | Villa ........................ G01S 5/14 340/539.1 |
| 9,243,381 B2 | 1/2016 | Behmlander et al. |
| 9,311,513 B2 | 4/2016 | Miller |
| 9,317,037 B2 * | 4/2016 | Byford ................. G05D 1/0231 |
| RE46,310 E * | 2/2017 | Hoffberg ............. G06F 3/0482 |

(56) References Cited

U.S. PATENT DOCUMENTS

| | | | |
|---|---|---|---|
| 9,611,625 | B2 | 4/2017 | Koetz et al. |
| 9,754,293 | B1* | 9/2017 | Wingle .............. G06Q 30/0276 |
| 2002/0005297 | A1 | 1/2002 | Alft et al. |
| 2003/0093187 | A1* | 5/2003 | Walker .................... B64C 13/20 701/1 |
| 2003/0187537 | A1* | 10/2003 | Hocke ............... H01L 21/67294 700/121 |
| 2004/0164140 | A1* | 8/2004 | Voeller .................. G07C 5/008 235/375 |
| 2004/0203360 | A1* | 10/2004 | Yamagiwa ............... B62H 5/20 455/41.1 |
| 2004/0227645 | A1 | 11/2004 | Lujan et al. |
| 2004/0266296 | A1 | 12/2004 | Martinsson et al. |
| 2005/0007239 | A1 | 1/2005 | Woodard et al. |
| 2005/0143883 | A1* | 6/2005 | Yamagiwa ............. G06Q 10/06 701/29.6 |
| 2005/0288937 | A1 | 12/2005 | Verdiramo |
| 2006/0042734 | A1 | 3/2006 | Turner et al. |
| 2006/0226974 | A1 | 10/2006 | Fluegel |
| 2006/0226984 | A1 | 10/2006 | Menke |
| 2006/0261146 | A1* | 11/2006 | Harada ................... B60R 13/10 235/375 |
| 2007/0108296 | A1 | 5/2007 | Konopka et al. |
| 2007/0241908 | A1 | 10/2007 | Coop |
| 2007/0290856 | A1 | 12/2007 | Martin |
| 2008/0000114 | A1 | 1/2008 | Bentley |
| 2008/0001771 | A1 | 1/2008 | Faoro et al. |
| 2008/0231458 | A1 | 9/2008 | Fein |
| 2008/0284571 | A1 | 11/2008 | Wilbrink et al. |
| 2009/0289582 | A1 | 11/2009 | Armitage et al. |
| 2010/0045311 | A1 | 2/2010 | Chung |
| 2010/0079288 | A1 | 4/2010 | Collins et al. |
| 2010/0142759 | A1 | 6/2010 | Ridley et al. |
| 2010/0164742 | A1 | 7/2010 | Anderson |
| 2010/0170119 | A1 | 7/2010 | Lopez Almendros et al. |
| 2010/0238002 | A1 | 9/2010 | Ryan et al. |
| 2010/0275473 | A1 | 11/2010 | Maher |
| 2011/0162241 | A1 | 7/2011 | Wangsness |
| 2011/0200193 | A1 | 8/2011 | Blitz et al. |
| 2011/0260834 | A1 | 10/2011 | Chapman et al. |
| 2012/0098654 | A1 | 4/2012 | Ebert |
| 2012/0123611 | A1 | 5/2012 | Grasso et al. |
| 2012/0260539 | A1 | 10/2012 | Guimaraes et al. |
| 2013/0035875 | A1 | 2/2013 | Hall et al. |
| 2013/0049935 | A1 | 2/2013 | Miller |
| 2013/0174453 | A1 | 7/2013 | Cheyne et al. |
| 2013/0207783 | A1 | 8/2013 | Cruzado et al. |
| 2013/0271274 | A1 | 10/2013 | Ebert |
| 2014/0039285 | A1 | 2/2014 | Goodnow et al. |
| 2014/0144819 | A1 | 5/2014 | Verdegan et al. |
| 2014/0173948 | A1 | 6/2014 | Ok et al. |
| 2014/0284143 | A1 | 9/2014 | Staengler et al. |
| 2015/0035673 | A1 | 2/2015 | Miller |
| 2015/0107075 | A1 | 4/2015 | Clarke et al. |
| 2015/0149049 | A1 | 5/2015 | Bewley et al. |
| 2015/0284935 | A1 | 10/2015 | Egger et al. |
| 2016/0340866 | A1 | 11/2016 | Koetz et al. |

FOREIGN PATENT DOCUMENTS

| | | |
|---|---|---|
| CN | 101832296 | 9/2010 |
| GB | 11341814 | 12/1973 |
| JP | 2008291519 | 12/2008 |
| SU | 876887 | 10/1981 |
| WO | WO2007/0128068 | 11/2007 |
| WO | WO2010096873 | 9/2010 |
| WO | WO20120017192 | 2/2012 |
| WO | WO20120107848 | 8/2012 |
| WO | WO20120116408 | 9/2012 |
| WO | WO20150126923 | 8/2015 |

OTHER PUBLICATIONS

International Preliminary Report on Patentability for Application No. PCT/US2012/052798 dated Mar. 4, 2014 (5 pages).
First Examination Report from the Australian Patent Office for Application No. 2012302078 dated Nov. 21, 2014 (3 pages).
Second Examination Report from the Australian Patent Office for Application No. 2012302078 dated Mar. 20, 2015 (4 pages).
Examination Report from the Intellectual Property Office of Mexico for Application No. MX/a/2014/002453 dated May 3, 2015 (4 pages).
First Office Action from the State Intellectual Property Office of the People's Republic of China for Application No. 2012800426944 dated Jun. 1, 2015 (20 pages).
Office Action from the US Patent and Trademark Office for U.S. Appl. No. 14/517,479 dated Aug. 20, 2015 (16 pages).
Second Office Action from the State Intellectual Property Office of the People's Republic of China for Application No. 2012800426944 dated Jan. 28, 2016 (20 pages).
Office Action from the Federal Service for Intellectual Property of Russia for Application No. 2014112222 dated Apr. 6, 2016 (8 pages).
Office Action from the US Patent and Trademark Office for Application No. 15/066,499 dated May 18, 2016 (21 pages).
Third Office Action from the State Intellectual Property Office of the People's Republic of China for Application No. 2012800426944 dated Aug. 2, 2016 (19 pages).
Office Action from the US Patent and Trademark Office for U.S. Appl. No. 15/066,499 dated Sep. 28, 2016 (21 pages).
First Office Action from the State Intellectual Property Office of the People's Republic of China for Application No. 2016204742236 dated Sep. 18, 2016 (3 pages).
Office Action from the US Patent and Trademark Office for U.S. Appl. No. 14/719,624 dated Nov. 21, 2016 (9 pages).
Decision to Grant with Search Report from the Russian Patent Office for Application No. 2016150829 dated Dec. 19, 2017 (22 pages with English Translation).
Technical Report from Peru Patent Office for Application No. 290.14 dated Apr. 27, 2018 (26 pages including English translation).
International Preliminary Report on Patentability for Application No. PCT/US2016/061590 dated May 24, 2018 (7 pages).
Office Action from the Canadian Patent Office for Application No. 2846844 dated Jun. 15, 2018 (4 pages).
Notice of Correction from the Chilean Patent Office for Application No. 2014000485 first known to us Oct. 25, 2017 (2 pages including Statement of Relevance).
Examiner's Report from the Chilean Patent Office for Application No. 201601194 dated Oct. 16, 2017 (7 pages including Statement of Relevance).
Examination Report from the Chilean Patent Office for Application No. 201601194 dated Feb. 14, 2018 (7 pages Including Statement of Relevance).
Office Action issued from the Mexican Patent Office for related Application No. MX/a/2017/001551 dated Aug. 10, 2018 (8 pages including English Translation).
Office Action issued from the Indonesian Patent Office for related Application No. P-00201401386 dated Oct. 23, 2018 (7 pages including English Translation).

* cited by examiner

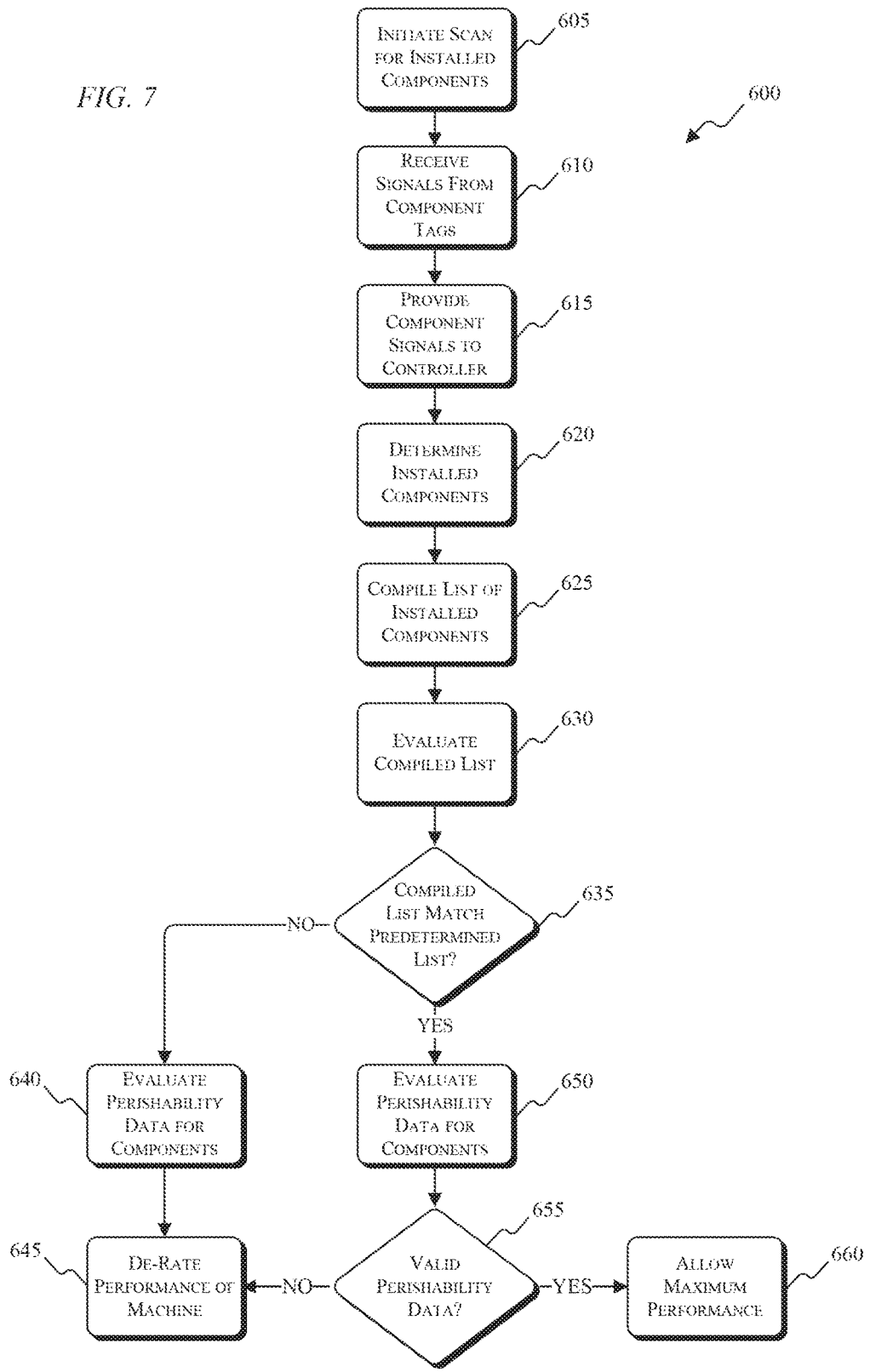

INDUSTRIAL MACHINE COMPONENT DETECTION AND PERFORMANCE CONTROL

RELATED APPLICATIONS

This application is a divisional application of U.S. application Ser. No. 14/719,624, filed May 22, 2015, the entire content of which is hereby incorporated by reference.

BACKGROUND

This invention relates to controlling the operation of an industrial machine, such as an electric rope or power shovel.

SUMMARY

Industrial machines, such as rope shovels, draglines, excavators, etc., are used to execute digging operations at, for example, a mining location. The efficiency and productivity of a mine is related to the ability to operate each industrial machine at optimum performance levels to maximize output. Industrial machines include a combination of electrical, mechanical, and electromechanical components that are specifically designed for a particular industrial machine. The precise configuration of the machine parts or components, such as motors, transmissions, and gear sets, allow the industrial machine to achieve rated power, capacities, and warranty life. Over time, however, these parts or components must be replaced as they become worn or damaged.

To ensure that an industrial machine will be able to continue operating at full or maximum performance following the replacement of the parts, it is desirable to ensure that the replacement parts meet the specifications and quality of the original equipment manufacturer ("OEM") parts. For example, it is not uncommon for parts on an industrial machine to be replaced over time. Parts are replaced due to damage, age, normal wear and tear, etc. If an operator chooses to install non-OEM parts on the industrial machine, it is possible that those replacement parts will not meet the specifications and quality of the original OEM parts. If the replacement parts do not match the specifications and quality of the original parts, the industrial machine can be damaged or rendered inoperable if operated at rated levels. In such instances, it can be detrimental to the performance and reliability of the industrial machine to operate the industrial machine at maximum performance levels because the replacement part may not be able to withstand such performance levels without failing.

It would be beneficial, when operating an industrial machine, to ensure that the parts that are installed in the industrial machine meet the performance criteria set forth by the OEM. In this way, the operator of the industrial machine knows that the industrial machine can and will be operated at maximum performance levels. In order to ensure that the parts that are installed in the industrial machine meet OEM specifications, parts that are installed in the industrial machine can each include an identification tag, such as a radio-frequency identification ("RFID") tag, that can be read to ensure that the part is a certified part. Each identification tag can, for example, emit a signal that is specific to that identification tag and a corresponding part or component (e.g., the signal can include information related to the identification of the part).

Each identification tag is operable to communicate directly with a controller of the industrial machine or through a modular network of intermediate component or devices (e.g., a tag reader, other components, etc.). For example, an RFID tag reader associated with the industrial machine can be used to receive a signal from each RFID tag. The received signals are used to compile a list of parts that are installed in the industrial machine. If the list of parts installed in the industrial machine does not match a predetermined parts list, the performance of the industrial machine can be limited or de-rated. For example, a hoist, crowd, or swing torque can be limited if the list of parts installed in the industrial machine does not match the predetermined list of parts. Additionally, if the parts installed in the industrial machine does match the predetermined list of parts, then the industrial machine can be allowed to operate at greater than maximum performance for certain operations or during certain portions of a digging cycle. For example, hoist torque can be increased early in a digging operation (e.g., increased to 120% of normal operational values).

In one embodiment, the invention provides an industrial machine that includes a plurality of components, an identification tag reader, an actuator, and a controller. The plurality of components is installed in the industrial machine and each of the plurality of components includes an identification tag. The identification tag reader is operable to receive a signal from each of the plurality of identification tags, and each signal received from the plurality of identification tags is specific to a respective one of the plurality of components. The actuator has at least one operating parameter. The controller includes a processor and a memory and is configured or operable to identify the plurality of components that is installed in the industrial machine based on the signals from each of the plurality of identification tags, compare the identified plurality of components that is installed in the industrial machine to a predetermined list of components that is expected to be installed in the industrial machine, and modify an operational setting of the at least one operating parameter when the identified plurality of components that is installed in the industrial machine does not match the predetermined list of components that is expected to be installed in the industrial machine.

In another embodiment, the invention provides a method of controlling the operation of an industrial machine. The method includes receiving a signal from each of a plurality of identification tags. Each signal received from the plurality of identification tags is specific to a respective one of a plurality of components. The method also includes identifying, using a processor, a plurality of components that is installed in the industrial machine based on the signals from each of the plurality of identification tags, and comparing, using the processor, the identified plurality of components that is installed in the industrial machine to a predetermined list of components that is expected to be installed in the industrial machine. The method also includes modifying, using the processor, an operational setting of at least one operating parameter of an actuator when the identified plurality of components that is installed in the industrial machine does not match the predetermined list of components that is expected to be installed in the industrial machine.

In another embodiment, the invention provides a method of controlling the operation of an industrial machine. The method includes receiving a signal from each of a plurality of identification tags. Each signal received from the plurality of identification tags is specific to a respective one of a plurality of components. The method also includes identifying, using a processor, a plurality of components that is installed in the industrial machine based on the signals from each of the plurality of identification tags, and comparing, using the processor, the identified plurality of components that is installed in the industrial machine to a predetermined list of components that is expected to be installed in the industrial machine. The method also includes modifying a setting of the at least one operating parameter when the identified plurality of components that is installed in the industrial machine match the predetermined list of components that is expected to be installed in the industrial machine.

In another embodiment, the invention provides an industrial machine that includes a plurality of components, an identification tag reader, an actuator, and a controller. The plurality of components is installed in the industrial machine and each of the plurality of components includes an identification tag. The identification tag reader is operable to receive a signal from each of the plurality of identification tags, and each signal received from the plurality of identification tags is specific to a respective one of the plurality of components. The actuator has at least one operating parameter. The controller includes a processor and a memory and is configured or operable to identify the plurality of components that is installed in the industrial machine based on the signals from each of the plurality of identification tags, compare the identified plurality of components that is installed in the industrial machine to a predetermined list of components that is expected to be installed in the industrial machine, and modify a setting of the at least one operating parameter when the identified plurality of components that is installed in the industrial machine match the predetermined list of components that is expected to be installed in the industrial machine.

Before any embodiments of the invention are explained in detail, it is to be understood that the invention is not limited in its application to the details of the configuration and arrangement of components set forth in the following description or illustrated in the accompanying drawings. The invention is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components may be utilized to implement the invention. For example, "servers" and "computing devices" described in the specification can include one or more processing units, one or more computer-readable medium modules, one or more input/output interfaces, and various connections (e.g., a system bus) connecting the components.

Other aspects of the invention will become apparent by consideration of the detailed description and accompanying drawings.

BRIEF DESCRIPTION OF THE DRAWINGS

FIG. 7 is a process for controlling operational performance of an industrial machine based on installed components according to another embodiment of the invention.

DETAILED DESCRIPTION

The invention described herein relates to an industrial machine that includes a plurality of parts or components. In order to ensure that the industrial machine is able to operate at its maximum performance capability, the industrial machine must confirm that the parts or components installed in the industrial machine conform to minimum or acceptable performance standards. Performance standards of particular parts or components can be ensured when those parts are certified to meet minimum or acceptable standards of an original equipment manufacturer ("OEM"). The industrial machine can ensure that installed parts or components meet minimum or acceptable performance standards by confirming that the parts installed in the industrial machine are certified parts or components. The presence of certified parts or components can be verified by receiving a signal from each component or part that identifies it as an OEM certified component or part. For example, each part or component can include a radio frequency identification ("RFID") tag that provides identification information to the industrial machine. The industrial machine can compile the information received from the parts or components of the industrial machine and determine whether the parts or components installed in the industrial machine will allow the industrial machine to be operated at maximum performance capabilities.

Figure 1:
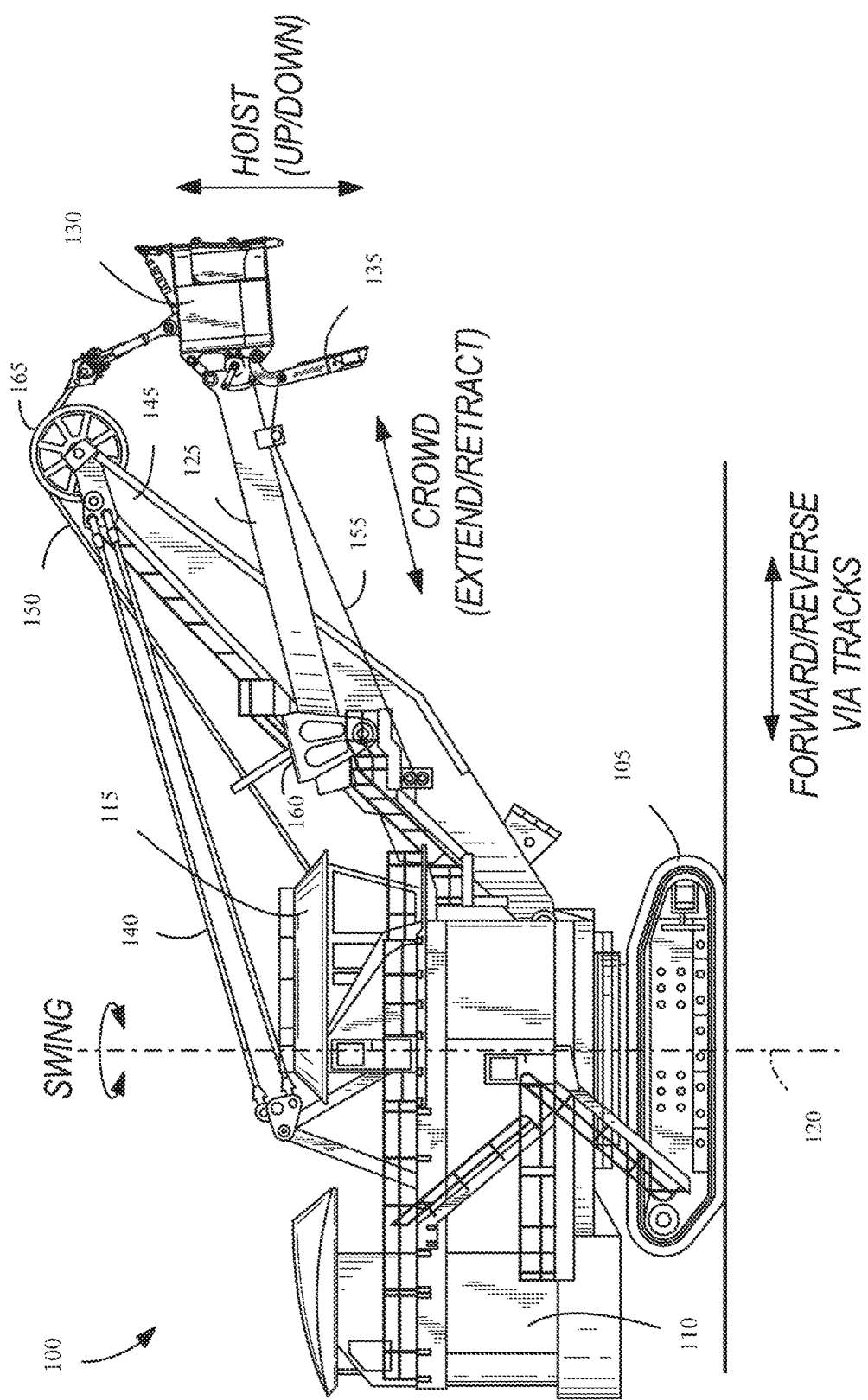
FIG. 1 illustrates an industrial machine according to an embodiment of the invention.

Although the invention described herein can be applied to, performed by, or used in conjunction with a variety of industrial machines (e.g., a rope shovel, a dragline, AC machines, DC machines, excavators, etc.), embodiments of the invention described herein are described with respect to an electric rope or power shovel, such as the shovel 100 shown in FIG. 1. The shovel 100 includes tracks 105 for propelling the shovel 100 forward and backward, and for turning the shovel 100 (i.e., by varying the speed and/or direction of left and right tracks relative to each other). The tracks 105 support a base 110 including a cab 115. The base 110 is able to swing or swivel about a swing axis 120, for instance, to move from a digging location to a dumping location. Movement of the tracks 105 is not necessary for the swing motion. The shovel 100 further includes a pivotable dipper handle 125 and dipper 130. The dipper 130 includes a door 135 for dumping contents of the dipper 130. The shovel 100 includes suspension cables 140 coupled between the base 110 and a boom 145 for supporting the boom 145. The shovel 100 also includes a wire rope or hoist cable 150 attached to a winch and hoist drum within the base 110 for winding the hoist cable 150 to raise and lower the dipper 130, and a dipper trip cable 155 connected between another winch (not shown) and the dipper door 135. The shovel 100 also includes a saddle block 160 and a sheave 165. In some embodiments, the shovel 100 is a P&H® 4100 series shovel produced by Joy Global Inc.

Figure 2:
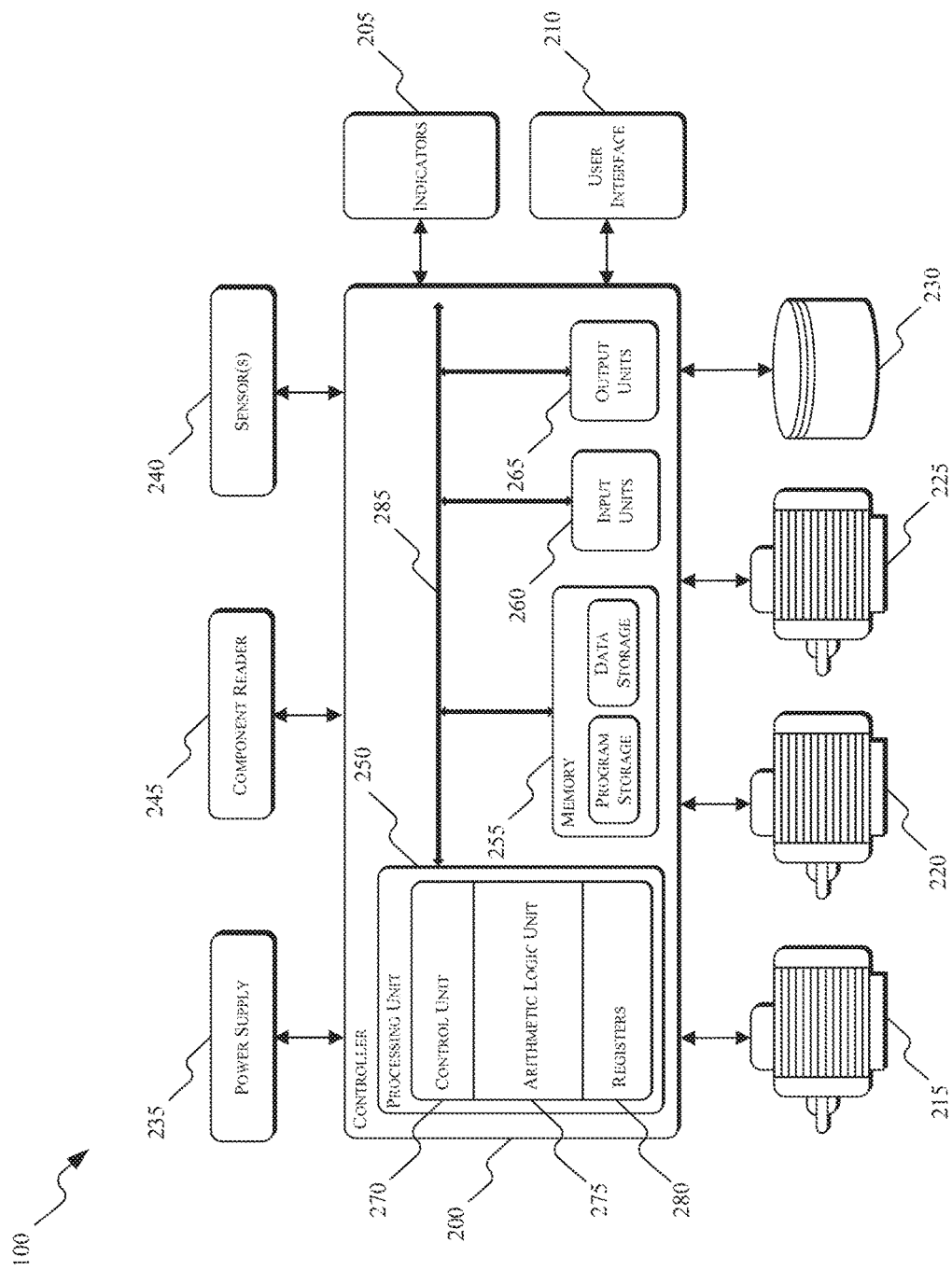
FIG. 2 illustrates a control system of the industrial machine of FIG. 1 according to an embodiment of the invention.

FIG. 2 illustrates a controller 200 associated with the shovel 100 of FIG. 1 or another industrial machine. The controller 200 is electrically and/or communicatively connected to a variety of modules or components of the industrial machine 100. For example, the illustrated controller 200 is connected to one or more indicators 205, a user interface module 210, one or more hoist actuators or motors and hoist drives 215, one or more crowd actuators or motors and crowd drives 220, one or more swing actuators or motors and swing drives 225, a data store or database 230, a power supply module 235, and one or more sensors 240. The controller 200 includes combinations of hardware and software that are operable to, among other things, control the operation of the industrial machine 100, control the position of the boom 145, the dipper handle 125, the dipper 130, etc., activate the one or more indicators 205 (e.g., a liquid crystal display ["LCD"]), monitor the operation of the industrial machine 100, etc. The one or more sensors 240 include, among other things, a loadpin strain gauge, one or more inclinometers, gantry pins, one or more motor field modules, one or more resolvers, etc. In some embodiments, a crowd drive other than a crowd drive for a motor can be used (e.g., a crowd drive for a single legged handle, a stick, a hydraulic cylinder, etc.).

In some embodiments, the controller 200 includes a plurality of electrical and electronic components that provide power, operational control, and protection to the components and modules within the controller 200 and/or industrial machine 100. For example, the controller 200 includes, among other things, a processing unit 250 (e.g., a microprocessor, a microcontroller, or another suitable programmable device), a memory 255, input units 260, and output units 265. The processing unit 250 includes, among other things, a control unit 270, an arithmetic logic unit ("ALU") 275, and a plurality of registers 280 (shown as a group of registers in FIG. 2), and is implemented using a known computer architecture, such as a modified Harvard architecture, a von Neumann architecture, etc. The processing unit 250, the memory 255, the input units 260, and the output units 265, as well as the various modules connected to the controller 200 are connected by one or more control and/or data buses (e.g., common bus 285). The control and/or data buses are shown generally in FIG. 2 for illustrative purposes. The use of one or more control and/or data buses for the interconnection between and communication among the various modules and components would be known to a person skilled in the art in view of the invention described herein. In some embodiments, the controller 200 is implemented partially or entirely on a semiconductor chip, is a field-programmable gate array ("FPGA"), is an application specific integrated circuit ("ASIC"), etc.

The memory 255 includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices or data structures. The processing unit 250 is connected to the memory 255 and executes software instructions that are capable of being stored in a RAM of the memory 255 (e.g., during execution), a ROM of the memory 255 (e.g., on a generally permanent basis), or another non-transitory computer readable medium such as another memory or a disc. Software included in the implementation of the industrial machine 100 can be stored in the memory 255 of the controller 200. The software includes, for example, firmware, one or more applications, program data, filters, rules, one or more program modules, and other executable instructions. The controller 200 is configured or operable to retrieve from memory and execute, among other things, instructions related to the control processes and methods described herein. In other constructions, the controller 200 includes additional, fewer, or different components.

The power supply module 235 supplies a nominal AC or DC voltage to the controller 200 or other components or modules of the industrial machine 100. The power supply module 235 is powered by, for example, a power source having nominal line voltages between 100V and 240V AC and frequencies of approximately 50-60 Hz. The power supply module 235 is also configured to supply lower voltages to operate circuits and components within the controller 200 or industrial machine 100. In other constructions, the controller 200 or other components and modules within the industrial machine 100 are powered by one or more batteries or battery packs, or another grid-independent power source (e.g., a generator, a solar panel, etc.).

The user interface module 210 is used to control or monitor the industrial machine 100. For example, the user interface module 210 is operably coupled to the controller 200 to control the position of the dipper 130, the position of the boom 145, the position of the dipper handle 125, etc. The user interface module 210 includes a combination of digital and analog input or output devices required to achieve a desired level of control and monitoring for the industrial machine 100. For example, the user interface module 210 includes a display (e.g., a primary display, a secondary display, etc.) and input devices such as touch-screen displays, a plurality of knobs, dials, switches, buttons, etc. The display is, for example, a liquid crystal display ("LCD"), a light-emitting diode ("LED") display, an organic LED ("OLED") display, an electroluminescent display ("ELD"), a surface-conduction electron-emitter display ("SED"), a field emission display ("FED"), a thin-film transistor ("TFT") LCD, etc. The user interface module 210 can also be configured or operable to display conditions or data associated with the industrial machine 100 in real-time or substantially real-time. For example, the user interface module 210 is configured to display measured electrical characteristics of the industrial machine 100, the status of the industrial machine 100, the position of the dipper 130, the position of the dipper handle 125, etc. In some implementations, the user interface module 210 is controlled in conjunction with the one or more indicators 205 (e.g., LEDs, speakers, etc.) to provide visual and/or auditory indications of the status or conditions of the industrial machine 100.

Figure 3:
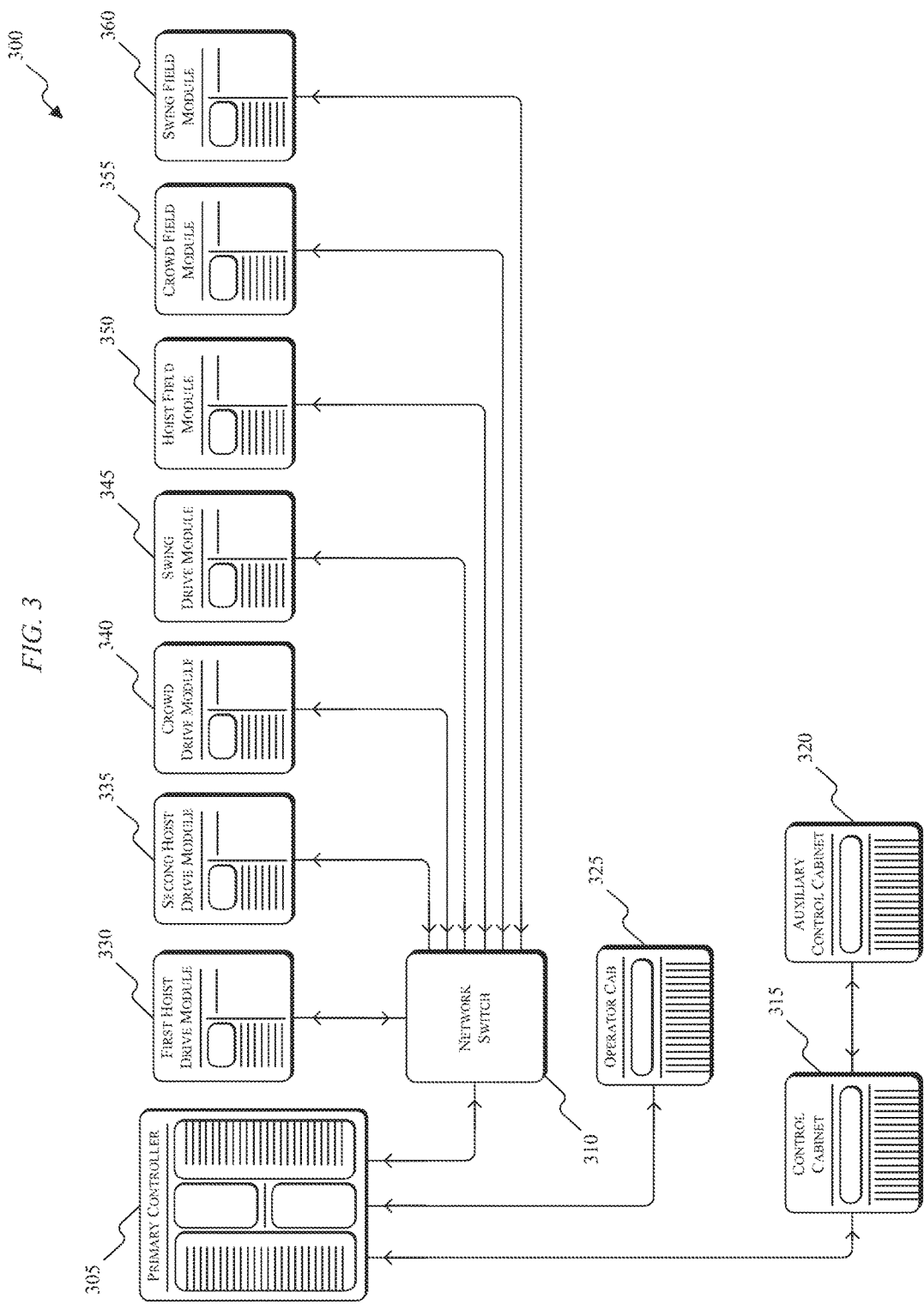
FIG. 3 illustrates a control system of the industrial machine of FIG. 1 according to another embodiment of the invention.

FIG. 3 illustrates a more detailed control system 300 for the industrial machine 100. For example, the industrial machine 100 includes a primary controller 305, a network switch 310, a control cabinet 315, an auxiliary control cabinet 320, an operator cab 325, a first hoist drive module 330, a second hoist drive module 335, a crowd drive module 340, a swing drive module 345, a hoist field module 350, a crowd field module 355, and a swing field module 360. The various components of the control system 300 are connected by and communicate through, for example, a fiber-optic communication system utilizing one or more network protocols for industrial automation, such as process field bus ("PROFIBUS"), Ethernet, ControlNet, Foundation Fieldbus, INTERBUS, controller-area network ("CAN") bus, etc. The control system 300 can include the components and modules described above with respect to FIG. 2. For example, the one or more hoist actuators and/or drives 215 correspond to first and second hoist drive modules 330 and 335, the one or more crowd actuators and/or drives 220 correspond to the crowd drive module 340, and the one or more swing actuators and/or drives 225 correspond to the swing drive module 345. The user interface module 210 and the indicators 205 can be included in the operator cab 325, etc. A strain gauge, an inclinometer, gantry pins, resolvers, etc., can provide electrical signals to the primary controller 305, the control cabinet 315, the auxiliary control cabinet 320, etc.

The first hoist drive module 330, the second hoist drive module 335, the crowd drive module 340, and the swing drive module 345 are configured or operable to receive control signals from, for example, the primary controller 305 to control hoisting, crowding, and swinging operations of the industrial machine 100. The control signals are associated with drive signals for hoist, crowd, and swing actuators 215, 220, and 225 of the industrial machine 100. As the drive signals are applied to the actuators 215, 220, and 225, the outputs (e.g., electrical and mechanical outputs) of the actuators are monitored and fed back to the primary controller 305 (e.g., via the field modules 350-360). The outputs of the actuators include, for example, speed, torque, power, current, pressure, etc. Based on these and other signals associated with the industrial machine 100, the primary controller 305 is configured to determine or calculate one or more operational states or positions of the industrial machine 100 or its components. In some embodiments, the primary controller 305 determines a dipper position, a dipper handle angle or position, a hoist rope wrap angle, a hoist motor rotations per minute ("RPM"), a crowd motor RPM, a dipper speed, a dipper acceleration, etc.

Figure 4A:
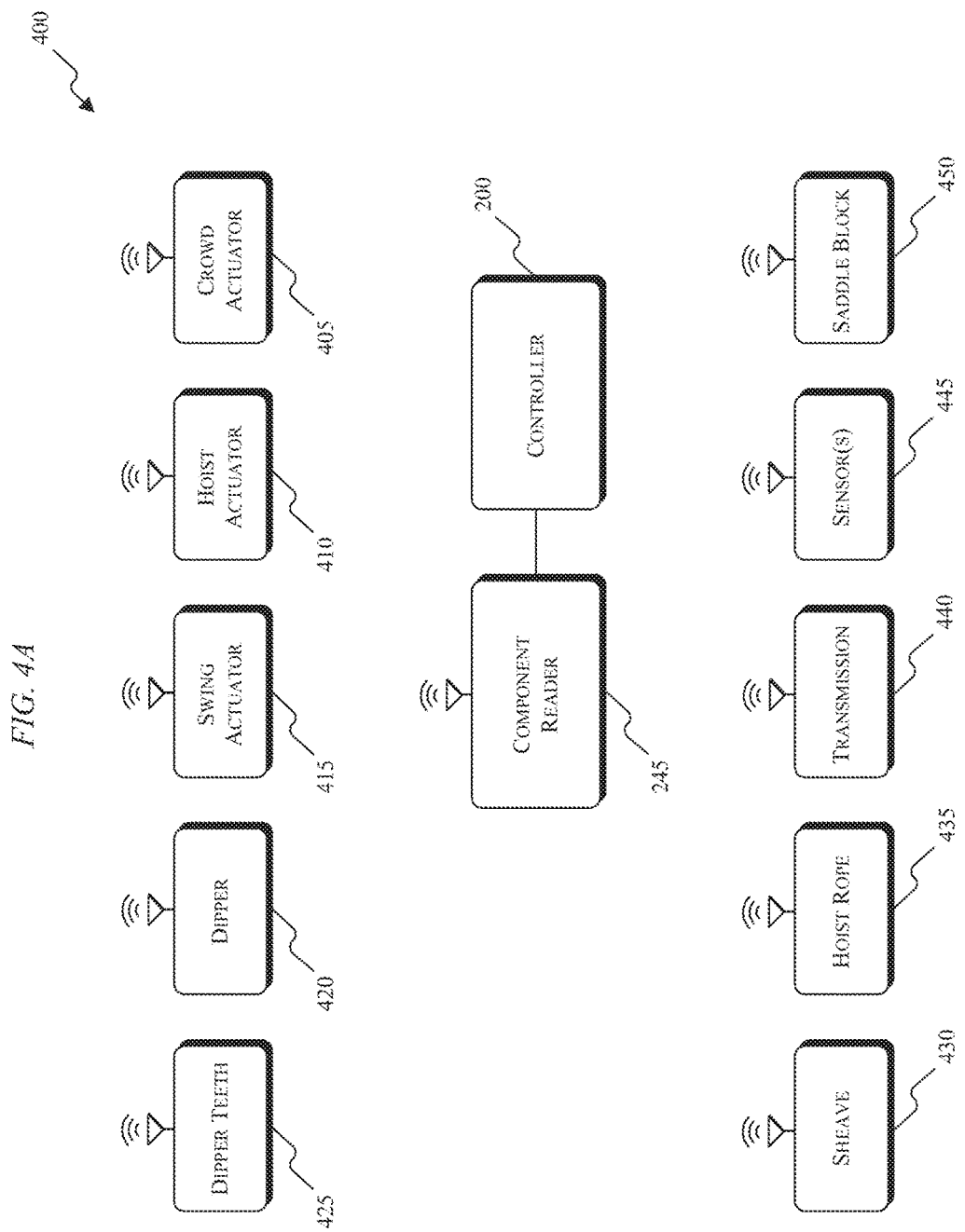
FIG. 4A illustrates a component reader wirelessly communicating with a plurality of components of an industrial machine.
Figure 4B:
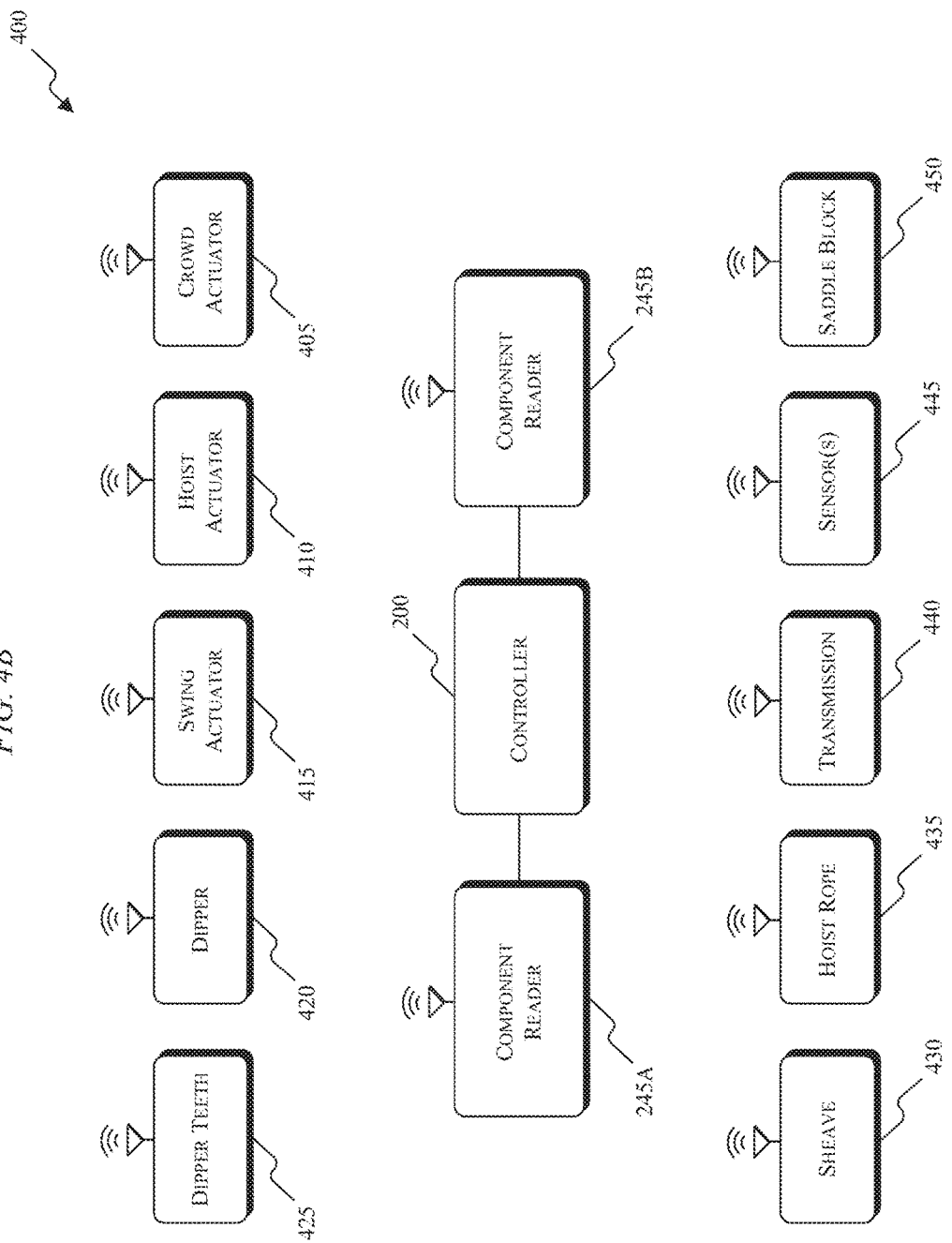
FIG. 4B illustrates a plurality of component readers wirelessly communicating with a plurality of components of an industrial machine.

The controller 200 and/or the control system 300 can be used to implement a component identification system. FIG. 4A illustrates the component reader 245 connected to the controller 200 in an identification system 400 of industrial machine components. The components illustrated in FIG. 4A are provided for illustrative purposes and are not intended to be limiting to the number or variety of components that can be included in the system 400. In FIG. 4A, the system 400 includes a crowd actuator 405, a hoist actuator 410, a swing actuator 415, a dipper 420, dipper teeth 425, a hoist sheave 430, a hoist rope 435, a transmission 440, one or more sensors 445, and a saddle block 450. In some embodiments, each component in the driveline, power, and propulsion systems of an industrial machine are included in the system 400. Each of the components in the system 400 is operable to communicate wirelessly with the component reader 245 to provide the component reader 245 with one or more signals (e.g., identification signals). The identification signals include information that can be interpreted by the component reader 245 or the controller 200 to identify and/or verify components in the system 400 that are installed on an industrial machine 100. Although one component reader 245 is illustrated in FIG. 4A, the system 400 can also include more than one component reader 245. For example, as illustrated in FIG. 4B, the identification system 400 includes a plurality of component readers 245A and 245B. In other embodiments, the system 400 includes a component reader for each installed component (e.g., each component that is expected to be installed in the industrial machine 100). The component readers can by positioned or located in proximity to the location or locations where one or more components are installed in the industrial machine 100. In some embodiments, the component reader 245 is included or incorporated into the controller 200.

Figure 5:
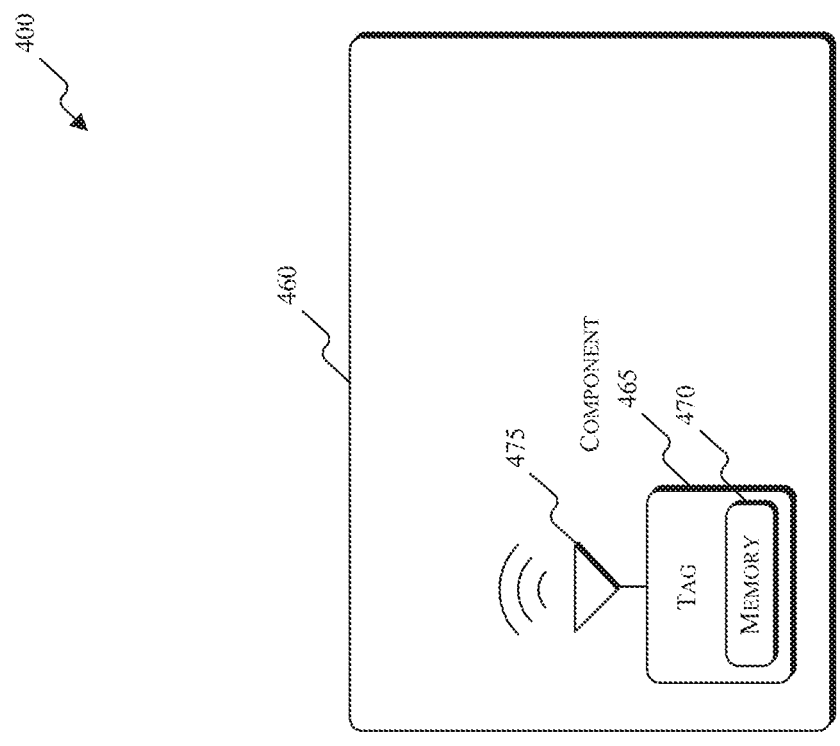
FIG. 5 illustrates a component including an identification tag and a component reader for receiving information from the identification tag.
Figure 5:
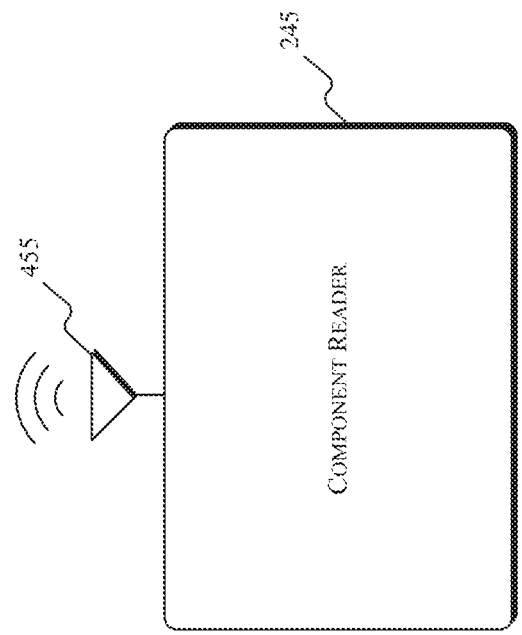

FIG. 5 illustrates the component reader 245 in more detail. The component reader 245 includes an antenna 455 for sending and/or receiving signals from a component 460 in the identification system 400. Only one component is shown in FIG. 5 for illustrative purposes. However, as shown previously in FIGS. 4A and 4B, the identification system 400 can include any number of components of the industrial machine 100. The component 460 illustrated in FIG. 5 includes an identification tag or device 465. The identification tag 465 is configured or operable to communicate with the component reader 245 (or controller 200) using any of a variety of short and/or long range communication protocols and devices (e.g., tags, transmitters, receivers, transceivers, etc.). For example, the identification tag 465 can communicate with the component reader 245 over a short range wireless network using, for example, a radio frequency ("RF") communication protocol (e.g., operating at a frequency in the range of 120 kHz-10 GHz) to transmit information, messages, and/or data. In some embodiments, the identification tag 465 and the component reader 245 communicate using a personal area network ("PAN"), a low-power wireless personal area network ("LP-WPAN"), and/or a local area network ("LAN"). The identification tag 465 and the component reader 245 can communicate using a variety of protocols, such as near-field communication ("NFC") (e.g., operating in the 13.56 MHz ISM frequency band), ZigBee (i.e., the IEEE 802.15.4 standard), Bluetooth® (i.e., the IEEE 802.15.1 standard), Wi-Fi® (i.e., the IEEE 802.11 standards), or another similar communication protocol. In other embodiments, the identification tag 465 communicates with the component reader 245 over a wide-area wireless communication network ("WAN") (e.g., a TCP/IP based network, a cellular network, such as, for example, a Global System for Mobile Communications ["GSM"] network, a General Packet Radio Service ["GPRS"] network, a Code Division Multiple Access ["CDMA"] network, an Evolution-Data Optimized ["EV-DO"] network, an Enhanced Data Rates for GSM Evolution ["EDGE"] network, a 3GSM network, a 4GSM network, a 4G network, a 4GLTE network, a Digital Enhanced Cordless Telecommunications ["DECT"] network, a Digital AMPS ["IS-136/TDMA"] network, or an Integrated Digital Enhanced Network ["iDEN"] network, etc.).

For descriptive purposes, the identification tag 465 is described with respect to embodiments of the invention that include an RFID tag as the identification tag 465 (e.g., operating at a frequency in the range of 120 kHz-10 GHz). However, as previously described, any of a variety of communication devices, networks, and protocols can be used to communicate identification information from a component 460 to the component reader 245 or controller 200. The RFID tag 465 includes a memory 470 and an antenna 475. In some embodiments, the RFID tag 465 is a passive RFID tag that is powered by energy received from the component reader 245. In other embodiments, the RFID tag is an active RFID tag or a battery-assisted passive RFID tag that includes a battery, and either transmits signals periodically to the component reader 245 or in response to the component reader 245.

The RFID tag 465 can be affixed to each component 460 in a tamper resistance package such that removing the tag (e.g., to place on a different part) or tampering with the tag in any way will result in the tag becoming inoperative. The identification tags are configured in such a manner that an identification tag cannot be removed from one component and placed on another component without compromising the operability of the identification tag. In some embodiments, the identification tag for each component is embedded in a nameplate of the component. The identification tags are configured to withstand and remain operable in high temperature conditions, low temperature conditions, high vibration environments, etc. In some embodiments, identification tags are affixed to or associated with each component in the driveline, power, and propulsion systems of an industrial machine.

The identification system 400 is operable to actively detect the inventory of components within the identification system 400 and corresponding perishability data for the components. The controller 200 receives signals or information from the components or component reader 245 and generates a matching code or data for each component. The controller 200 uses the data to compile or populate a list of active or installed components that can be compared to a predetermined or stored list of components. The predetermined list prevents a non-OEM producer from modifying the inventory list with non-OEM tag data. In some embodiments, the communication between a controller 200 or component reader 245 and an identification tag is encrypted to prevent unauthorized manufacturing of identification tags. In some embodiments, the industrial machine 100 or controller 200 of the industrial machine 100 includes an executable application that performs encryption such that the encryption algorithm is not accessible. A decryption algorithm can also be included in the controller 200 to perform the matching of installed components to expected components such that the decryption algorithm is also not accessible.

The system 400 records the state of the industrial machine and reports the state of the industrial machine to an operator. In some embodiments, the controller 200 is operable to communicate with a remote monitoring center to receive current perishability (e.g., component degradation, rated life/performance expiration, etc.) data set validations and to report current machine conditions. The controller 200 of the industrial machine 100 is operable to communicate over a wired or wireless network with a monitoring system to receive updated perishability data for components, report current machine conditions, report equipment status, etc. The state of the industrial machine 100 can include incident reports, components not responding, components not present, components damaged, de-rating actions, and other diagnostic data that can be used to analyze maintenance planning and performance monitoring. If the controller 200 does not receive an identification signal or valid perishability data from one or more components of the industrial machine 100, the controller 200 can take a corrective action (e.g., de-rate performance). Perishability data can be updated based upon overhaul or repair specifications from a service center when a component is overhauled or replaced.

When the stored component list exactly matches the active list of components, and the devices all reported valid perishability data sets, the controller allows rated performance of the industrial machine 100 in accordance with rated machine specifications (e.g., 100% performance). When the stored component list exactly matches the active list of components, but the components do not all have valid perishability data sets, the controller 200 reduces performance or de-rates the operation of the industrial machine 100 (e.g., power, torque, etc.) based on which components do not have valid perishability data. Such an operation limits or prevents the application of power or force that could result in unintended motions, damage, machine wear, or other outcomes that are not in accordance with OEM rated machine specifications. When the stored component list does not exactly match the active list of components and/or the components do not all have valid perishability data sets, the controller 200 reduces performance or de-rates the power, torque, etc., based on the components that are missing or the components that do not have valid perishability data. As used herein, a "missing" component is a component that was expected to be installed on the industrial machine but did not provide identification information to the component reader 245. The component may be installed in the industrial machine 100, but the component is not a certified component or the component has been tampered with. In some embodiments, when the stored component list exactly matches the active list of components and the components all have valid perishability data sets, the controller 200 enables adaptive controls for the industrial machine 100. The adaptive controls can allow for parameters of the industrial machine 100 to be set to or operated at values greater than 100% of rated performance (e.g., power, torque, etc.). In some embodiments, hoist, crowd, and/or swing forces, torques, powers, etc., can be modified to values greater than normal operational values (e.g., between 100% and 150% of normal or rated operational values).

Figure 6:
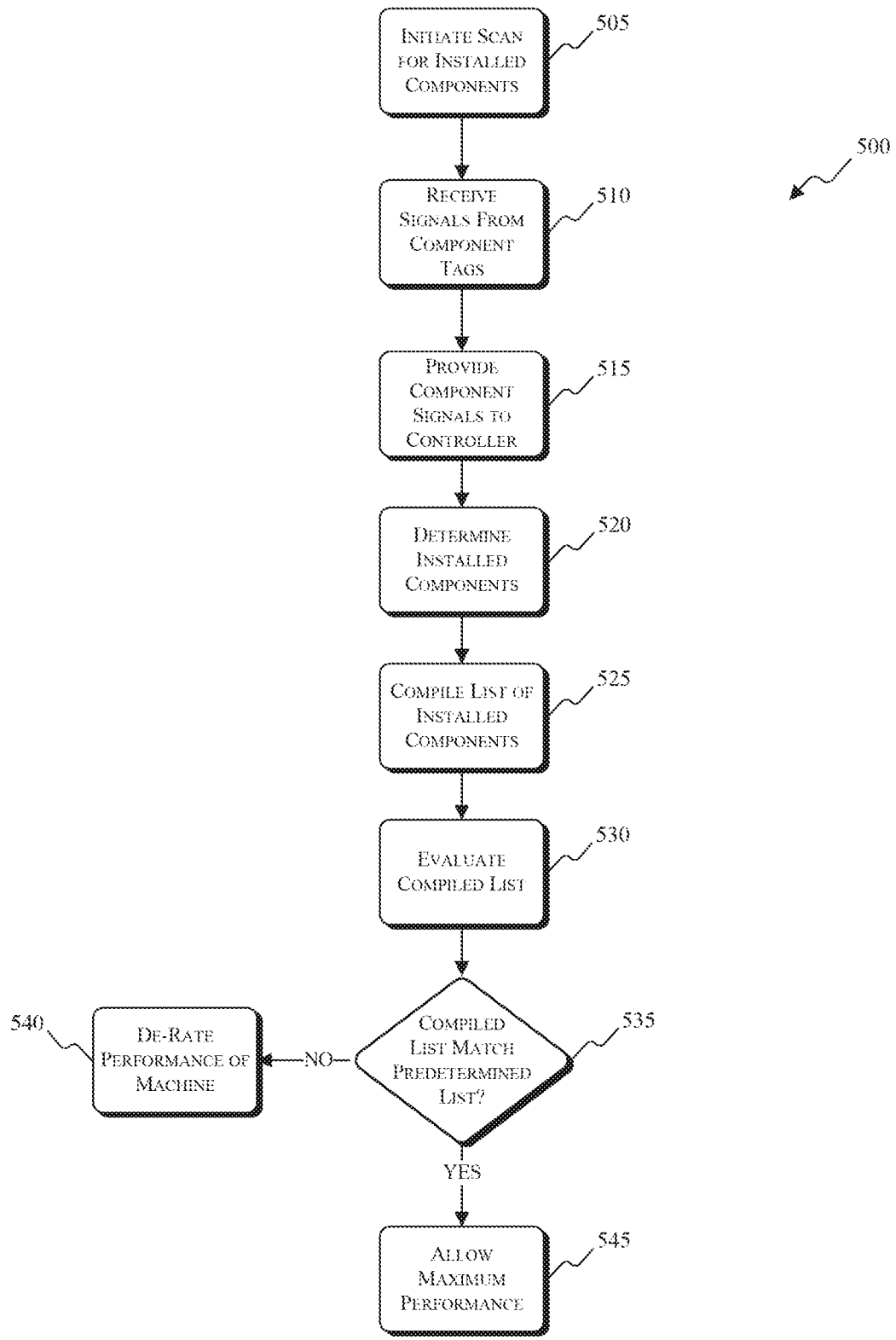
FIG. 6 is a process for controlling operational performance of an industrial machine based on installed components according to an embodiment of the invention.

FIG. 6 is a process 500 for detecting a plurality of components that are installed on or in an industrial machine, and correspondingly controlling the performance of the industrial machine based on the detected plurality of components. The process 500 begins with a scan of installed components being initiated (step 505). In some embodiments, the scan is performed sequentially by the component reader 245 with respect to each component that is expected to be installed in the industrial machine 100 (e.g., the component reader sends a signal to one specific component at a time). In other embodiments, all of the installed components are polled at the same time (e.g., the component reader 245 broadcasts a signal to all components of the industrial machine). After the scan has been initiated, the component reader 245 receives identification signals in response to the signal or signals sent to each of the plurality of components (step 510). In some embodiments, the component reader 245 receives a plurality of signals at substantially the same time. In such instances, the component reader 245 can perform multiple scans and/or broadcast multiple signals to ensure that each installed component completed the transmission of its identification information to the component reader 245. The component reader 245 then provides signals related to the installed components to the controller 200 (step 515). As described above, in some embodiments, the component reader 245 is included in the controller 200.

The controller 200 is operable to use the signals received from the component reader 245 to determine which components are installed in the industrial machine 100 (step 520). For example, each of the plurality of components provides an identification signal (e.g., a component serial number) to the component reader 245. The component reader 245 stores all of the received identification signals and provides all of the identification signals to the controller 200. The controller 200 analyzes or decodes the identification signals to identify the installed component. The controller 200 then compiles a list of all of the components installed in the industrial machine that provided valid identification information (step 525).

The compiled list of installed components is then evaluated (step 530) with respect to the components that were expected to be installed in the industrial machine 100. In some embodiments, the installed components and the expected components are compiled into a table. If a component that was expected to be installed in the industrial machine 100 has no corresponding installed component in the table, a flag can be set by the controller to indicate which component or components are not present. In other embodiments, the controller 200 sequentially retrieves, from memory 255, information related to each component that was expected to be installed in the industrial machine 100. The retrieved information can then be compared to each component in the compiled list of components. If a match between the retrieved information and the compiled list is identified, a flag is set to indicate that the component corresponding to the retrieved information is installed in the industrial machine 100. The controller 200 can then retrieve information related to the next component that was expected to be installed in the industrial machine and perform similar comparisons. After all comparisons have been made and all flags have been set (e.g., indicating that each component is installed or not installed), the controller 200 determines whether the compiled list of components matches the components that were expected to be installed in the industrial machine 100 (step 535).

If, at step 535, the compiled list of components does not match the components that were expected to be installed in the industrial machine 100, the controller 200 is configured or operable to perform a performance de-rating or limiting operation (step 540). For example, the controller 200 is configured or operable to reduce the performance or de-rate an operating parameter or operational setting of power, torque, etc., of a swing motor, a hoist motor, and/or a crowd motor based on the components that are not installed in the industrial machine (e.g., based on the percentage of verified components that are installed in the industrial machine). In some embodiments, the performance of the industrial machine is de-rated or reduced to between 50% and 100% of rated performance values. Such an operation limits or prevents the application of power, force, or motion that could result in unintended motions, damage, machine wear, or other outcomes that are not in accordance with OEM rated machine specifications.

If, at step 535, the compiled list of components does match the components that were expected to be installed in the industrial machine 100, the controller 200 is configured or operable to allow or maintain the performance of the industrial machine (e.g., an operating parameter or operational setting) at maximum rated values (e.g., 100% hoist force, 100% crowd force, etc.). In some embodiments, if the compiled list of parts installed in the industrial machine does match the expected parts, then the industrial machine 100 can be allowed to operate at greater than maximum performance for certain operations or during certain portions of a digging cycle. For example, in some embodiments, hoist torque can be increased early in a digging operation (e.g., to 120% of normal operational values). In other embodiments, hoist, crowd, and/or swing forces, torques, powers, etc., can be modified to values greater than normal operational values (e.g., between 100% and 150% of normal or rated operational values).

FIG. 7 is another process 600 for detecting a plurality of components that are installed on or in an industrial machine, and correspondingly controlling the performance of the industrial machine based on the detected plurality of components. The process 600 begins with a scan of installed components being initiated (step 605). In some embodiments, the scan is performed sequentially by the component reader 245 with respect to each component that is expected to be installed in the industrial machine 100 (e.g., the component reader sends a signal to one specific component at a time). In other embodiments, all of the installed components are polled at the same time (e.g., the component reader 245 broadcasts a signal to all components of the industrial machine). After the scan has been initiated, the component reader 245 receives identification signals in response to the signal or signals sent to each of the plurality of components (step 610). In some embodiments, the component reader 245 receives a plurality of signals at substantially the same time. In such instances, the component reader 245 can perform multiple scans and/or broadcast multiple signals to ensure that each installed component completed the transmission of its identification information to the component reader 245. The component reader 245 then provides signals related to the installed components to the controller 200 (step 615). As described above, in some embodiments, the component reader 245 is included in the controller 200.

The controller 200 is operable to use the signals received from the component reader 245 to determine which components are installed in the industrial machine 100 (step 620). For example, each of the plurality of components provides an identification signal (e.g., a component serial number) to the component reader 245. The component reader 245 stores all of the received identification signals and provides all of the identification signals to the controller 200. The controller 200 analyzes or decodes the identification signals to identify the installed component. The controller 200 then compiles a list of all of the components installed in the industrial machine that provided valid identification information (step 625).

The compiled list of installed components is then evaluated (step 630) with respect to the components that were expected to be installed in the industrial machine 100. In some embodiments, the installed components and the expected components are compiled into a table. If a component that was expected to be installed in the industrial machine 100 has no corresponding installed component in the table, a flag can be set by the controller to indicate which component or components are not present. In other embodiments, the controller 200 sequentially retrieves, from memory 255, information related to each component that was expected to be installed in the industrial machine 100. The retrieved information can then be compared to each component in the compiled list of components. If a match between the retrieved information and the compiled list is identified, a flag is set to indicate that the component corresponding to the retrieved information is installed in the industrial machine 100. The controller 200 can then retrieve information related to the next component that was expected to be installed in the industrial machine and perform similar comparisons. After all comparisons have been made and all flags have been set (e.g., indicating that each component is installed or not installed), the controller 200 determines whether the compiled list of components matches the components that were expected to be installed in the industrial machine 100 (step 635).

If, at step 635, the compiled list of components does not match the components that were expected to be installed in the industrial machine 100, the controller 200 evaluates the perishability data associated with the components that are installed on the industrial machine 100 (step 640), as described above. Based on the evaluation of the perishability data at step 640, the controller 200 is configured or operable to reduce the performance or de-rate an operating parameter or operational setting of power, torque, etc., of the hoist motor, swing motor, and/or crowd motor based on the components that are missing and the components that do not include valid perishability data (e.g., missing perishability data, out-of-date perishability data, component in need of repair or replacement, etc.) (step 645). For example, the controller 200 may reduce the performance of a crowd motor if a component is missing, and the controller 200 may reduce the performance of a hoist motor when a component is present but does not include valid perishability data. Such an operation limits or prevents the application of power, force, or motion that could result in unintended motions, damage, machine wear, or other outcomes that are not in accordance with OEM rated machine specifications. In some embodiments, performance is de-rated based on the percentage of verified components that are installed in the industrial machine and the percentage of components that include valid perishability data. In some embodiments, the performance of the industrial machine is de-rated or reduced to between 50% and 100% of rated performance values.

If, at step 635, the compiled list of components does match the components that were expected to be installed in the industrial machine 100, the controller 200 evaluates the perishability data associated with each of the components that is installed on the industrial machine 100 (step 650), as described above. If, at step 655, each of the components installed in the industrial machine 100 does not have valid perishability data sets (e.g., components degraded or expired rated life/performance), the controller 200 reduces performance or de-rates the operation of the industrial machine 100 (e.g., an operating parameter or operational setting of power, torque, etc.) based on which components are missing perishability data, as described above (step 645). Such an operation limits or prevents the application of power or motion that could result in unintended motions, damage, machine wear, or other outcomes that are not in accordance with OEM rated machine specifications. If, at step 655, each component includes valid perishability data, the controller 200 is configured or operable to allow or maintain the performance of the industrial machine (e.g., an operating parameter or operational setting) at maximum rated values (e.g., 100% hoist force, 100% crowd force, etc.) (step 660). In some embodiments, if the compiled list of parts installed in the industrial machine does match the expected parts and each part includes valid perishability data, then the controller 200 enables adaptive controls for the industrial machine 100. The adaptive controls can allow for parameters of the industrial machine 100 to be set to or operated at values greater than 100% of rated performance (e.g., power, torque, etc.). For example, in some embodiments, hoist torque can be increased early in a digging operation (e.g., to 120% of normal operational values). In other embodiments, hoist, crowd, and/or swing forces, torques, powers, etc., can be modified to values greater than normal operational values (e.g., between 100% and 150% of normal or rated operational values).

Thus, the invention provides, among other things, systems and methods for controlling the performance of an industrial machine based on the components that are installed in the industrial machine. Various features and advantages of the invention are set forth in the following claims.

What is claimed is:

1. A method of controlling operation of an industrial machine, the method comprising:
    receiving a signal from each of a plurality of identification tags, the signal received from each of the plurality of identification tags being specific to a respective one of a plurality of components installed in the industrial machine;
    identifying, using a processor, the plurality of components that is installed in the industrial machine based on the signal received from each of the plurality of identification tags;
    comparing, using the processor, the identified plurality of components that is installed in the industrial machine to a predetermined list of components that is expected to be installed in the industrial machine; and
    modifying a setting of at least one operating parameter when the identified plurality of components that is installed in the industrial machine matches the predetermined list of components that is expected to be installed in the industrial machine.

2. The method of claim 1, receiving the signal from each of the plurality of identification tags, includes receiving the signal from each of a plurality of radio-frequency identification ("RFID") tags.

3. The method of claim 2, wherein receiving the signal from each of the plurality of RFID tags includes receiving the signal from each of a plurality of passive RFID tags.

4. The method of claim 1, wherein modifying the setting of the at least one operating parameter includes increasing a level at which at least one operating parameter is set.

5. The method of claim 4, wherein modifying the setting of the at least one operating parameter includes increasing motor power of a motor.

6. The method of claim 5, wherein increasing the motor power of the motor includes increasing the motor power of the motor to between 100% and 150% of rated power.

7. The method of claim 4, wherein modifying the setting of the at least one operating parameter includes increasing motor torque of a motor.

8. The method of claim 7, wherein increasing the motor torque of the motor includes increasing the motor torque to between 100% and 150% of rated torque.

9. An industrial machine comprising:
    a plurality of components installed in the industrial machine, each of the plurality of components including an identification tag;
    an identification tag reader operable to receive a signal from the identification tag included in each of the plurality of components, the signal received from the identification tag included in each of the plurality of components being specific to a respective one of the plurality of components;
    an actuator having at least one operating parameter; and a controller including a processor and a memory, the controller configured to
identify the plurality of components that is installed in the industrial machine based on the signal received from the identification tag included in each of the plurality of components,
compare the identified plurality of components that is installed in the industrial machine to a predetermined list of components that is expected to be installed in the industrial machine, and
modify a setting of the at least one operating parameter when the identified plurality of components that is installed in the industrial machine matches the predetermined list of components that is expected to be installed in the industrial machine.

10. The industrial machine of claim 9, wherein the identification tag included in each of the plurality of components is a radio-frequency identification ("RFID") tag.

11. The industrial machine of claim 10, wherein the RFID tag is a passive RFID tag.

12. The industrial machine of claim 9, wherein the controller is configured to modify the setting of the at least one operating parameter by increasing a level at which the at least one operating parameter is set.

13. The industrial machine of claim 12, wherein the actuator is a motor and the at least one operating parameter is a motor power.

14. The industrial machine of claim 13, wherein the motor power is increased to between 100% and 150% of rated power.

15. The industrial machine of claim 12, wherein the actuator is a motor and the at leas tone operating parameter is a motor torque.

16. The industrial machine of claim 15, wherein the motor torque is increased to between 100% and 150% of rated torque.

17. A non-transitory, computer-readable medium comprising instructions that, when executed by a processor, perform a set of functions, the set of functions comprising:
receiving a signal from each of a plurality of identification tags, the signal received from each of the plurality of identification tags being specific to a respective one of a plurality of components installed in an industrial machine;
identifying the plurality of components that is installed in the industrial machine based on the signal received from each of the plurality of identification tags;
comparing the identified plurality of components that is installed in the industrial machine to a predetermined list of components that is expected to be installed in the industrial machine; and
modifying a setting of at least one operating parameter when the identified plurality of components that is installed in the industrial machine matches the predetermined list of components that is expected to be installed in the industrial machine.

18. The non-transitory, computer-readable medium of claim 17, wherein modifying the setting of the at least one operating parameter includes increasing a level at which the at least one operating parameter is set.

19. The non-transitory, computer-readable medium of claim 18, wherein increasing the level at which at least one operating parameter is set includes increasing motor power of a motor.

20. The non-transitory, computer-readable medium of claim 18, wherein increasing the level at which at least one operating parameter is set includes increasing motor torque of a motor.

* * * * *